United States Patent Office 3,365,476
Patented Jan. 23, 1968

3,365,476
PROCESS FOR THE PREPARATION OF
CARBOXYLIC ACID SALTS
Harold L. Dimond, Ross Township, Allegheny County, and Arthur C. Whitaker, Fox Chapel Borough, Pa., assignors to Gulf Research & Development Company, Pittsburgh, Pa., a corporation of Delaware
No Drawing. Filed Dec. 23, 1963, Ser. No. 332,849
16 Claims. (Cl. 260—413)

This invention relates to an improved process for preparing organic acid salts by the oxidative dehydrogenation of certain oxygen-containing organic compounds with an alkali metal compound.

The oxidative dehydrogenation of an oxygen-containing organic compound, such as a primary alcohol, in the presence of caustic, such as an alkali metal hydroxide to produce the salt of the corresponding organic acid is known. The process suffers, however, from low yields, especially in the oxidative dehydrogenation of the higher molecular weight oxygen-containing compounds, such as those obtained by the hydroformylation of the higher molecular weight olefins (the oxo process). The present invention overcomes the low yield disadvantages of the processes of the prior art.

In accordance with the invention, high yields of an organic acid salt are obtained by a process which comprises contacting at least one oxygen-containing compound reactant selected from the group consisting of primary alcohols, ethers having at least two hydrogen atoms on at least one of the carbon atoms adjacent to the ether oxygen atom, aldehydes, aldols and esters with an alkali metal compound selected from the class consisting of alkali metal oxides and hydroxides under oxidative dehydrogenation conditions in the presence of at least 0.1 weight percent solid carbon based on the amount of oxygen-containing compound reactant employed, said solid carbon having a surface area between 25 and 1700 square meters per gram.

The charge stock for the process of this invention can comprise any oxygen-containing organic compound selected from the class consisting of primary alcohols, ethers having at least two hydrogen atoms on a carbon atom adjacent to the ether oxygen atom, aldehydes, aldols, esters and mixtures thereof. By a primary alcohol is meant any compound containing an hydroxyl group directly connected to a carbon atom having at least two substituent hydrogen atoms. These oxygen-containing compounds can have between 1 and 40 carbon atoms per molecule. The preferred oxygen-containing organic compound reactants are those having between 4 and 20 carbon atoms per molecule. It is understood that the oxygen-containing compound reactants defined above may be polyfunctional, if desired, and include compounds such as, for example, acetals and glycols where at least one of the oxygen atoms is directly connected to a carbon atom having two substituent hydrogen atoms. The oxygen-containing compound reactants can be either straight or branched chain in structure. The charge stock can comprise a mixture of straight and branched chain primary alcohols, straight and branched chain aldehydes, admixtures of primary alcohols and aldehydes, together with esters, aldols and ethers as defined above, if desired.

The oxygen-containing organic compounds can be obtained from any suitable source. One suitable source includes the products obtained by the hydroformylation of olefins having between 2 and 39 carbon atoms per molecule. The hydroformylation reaction can be operated by methods well known in the art, such as those described, for example, in U.S. Patents 2,748,168 and 2,743,302. In the hydroformylation reaction, the olefin is reacted in the presence of carbon monoxide and hydrogen to form a saturated aldehyde having one more carbon atom than the original olefin. The catalyst, for example, can be any cobalt compound or cobalt itself, supported or unsupported. Preferred catalysts are the hydrocarbon soluble cobalt salts of aliphatic carboxylic acids having from 8 to 16 carbon atoms. Examples of suitable catalysts include cobalt naphthenate and cobalt octanoate. The hydroformylation reaction generally occurs at a temperature between 110° and 200° C. and increased pressures of between 1500 and 4500 p.s.i.g. The hydrogen to carbon monoxide weight ratio will normally be about 1:1, although ratios between 0.8:1 and 5:1 can be employed. The hydroformylation reaction products are normally decobalted and then hydrogenated. The process of this invention is applicable to the treatment of the intermediate or final products of the hydroformylation reaction.

Examples of suitable oxygen-containing compounds which can be used in the process of this invention include methyl alcohol; n-propyl alcohol; isobutyl alcohol; n-decyl, alcohol; lauryl alcohol; myristyl alcohol, cetyl; alcohol; stearyl alcohol; benzyl alcohol; 3,7-dibutyl hexadecyl alcohol; cinnamyl alcohol; n-triacontanol; n-pentatriacontanol; n-tetracontanol; ethylene glycol; 1,3-butanediol; glycerol; acetaldehyde; n-butyraldehyde; isovaleraldehyde; isooctylaldehyde; tridecylaldehyde; stearaldehyde; benzaldehyde; crotonaldehyde; 2,5-dipentyleicosanal; 4-tridecyldocosanal; 4-decyltriacontanal; aldol; 2-decyl-3-hydroxytetracosanal; 2-octyl-3-hydroxydodecanal; 2-pentyl-3-hydroxynonanal; 2-isopropyl-3-hydroxy-5-methyl hexanal; 2-undecyl-3-hydroxynonadecanal; 2-heneicosanyl-3-hydroxytetradecanal; 2-eiscosanyl-3-hydroxyeicosanal; 1,1-didecoxydecane; 1,1 - dipentoxypentacosane; 1,1 - dioctoxytetracosane; ethyl acetate; methyl isovalerate; ethyl pelargonate; isopropyl stearate; methyl lignocerate; tetradecylhexadecanoate; heptadecyloctadecanoate; nonadecylheneicosanoate; diethyl ether; methyl butyl ether; di-n-hexyl ether; di-isooctyl ether; methyl decyl ether; di-dodecyl ether; ethylene glycol dimethyl ether; decyl eicosyl ether; heptadecyl octadecyl ether; and pentacosyl pentadecyl ether.

The solid carbon which is employed in the process of this invention can be any of the commercially pure solid carbons having a surface area between 25 and 1700 square meters per gram. It is preferred that the surface area be between 300 and 1200 square meters per gram and more preferred that the solid carbon have a surface area between 400 and 800. Suitable solid carbons include the active carbons, carbon black, charcoals, lampblacks and cokes. Diamond and graphite are unsuitable for use in the subject process.

The commercially available high surface area carbons as defined above usually have a carbon content between about 85 and 100 percent, however, for bone charcoals and certain others the carbon content can be much lower. The carbon content of the solid carbon should be at least 65 weight percent, is preferably at least 85, and more preferably at least 90 weight percent. The remaining chemical constituents of the solid carbon vary considerably depending on the source from which the solid carbon is prepared, such as blood, bones, wood, gas, petroleum hydrocarbons, etc. Usually the solid carbons contain an inorganic ash comprising primarily metallic oxides. However, varying amounts of phosphates, carbonates and sulfur derivatives thereof can also be present. For bone charcoals, for example, calcium compounds are prevalent.

The carbon can be prepared in any suitable manner, for example, by the carbonization in the presence or absence of an oxygen-containing gas of animal or vegetable matter, liquid or gaseous hydrocarbons by methods well known in the art to produce, for example, active carbons, coke, carbon black, charcoal and lampblack. Methods of preparing these various forms of carbon can be found in the Kirk-Othmer "Encyclopedia of Chemical Technology" under "Carbon" in volumes 2 and 3 and the First Supplement volume.

The solid carbon is preferably in finely comminuted form. Carbon black and lampblack are normally in finely powered form having a particle size between 50 and 5,000 angstroms. Graphite, coke and active carbon (including charcoal) are usually available in larger sizes and are preferably ground to a mesh size between about 4 and about 1,000 before use.

Suitable commercially available carbons which can be employed in the process of this invention include (1) The "Darco" line sold by the Atlas Powder Company, and especially the active carbon Darco G-60 which is a highly purified carbon; (2) Type CXC and NXC sold by Columbian Carbon; (3) Pittsburgh Chemical Company carbons designated as type C; SGL; RB; and BL; and (4) The West Virginia Pulp and Paper Company line of carbons designated as Nuchar A; types WA; C-115; D-115; C-145; C-190; and CEE.

The amount of solid carbon to employ is at least 0.1 weight percent based on the oxygen-containing compound reactant. It is usual to employ between 0.1 and 10 weight percent solid carbon, and preferably between 0.2 and 2.0 weight percent, and more preferably between 0.5 and 1.5 weight percent.

The alkali metal compound for this reaction can be any alkali metal compound selected from the class consisting of alkali metal oxides and hydroxides. These include the oxides and hydroxides of sodium, lithium, potassium, rhubidium, cesium, francium, barium, calcium, strontium, radium and magnesium. The preferred alkali metal oxides and hydroxides are those of sodium and potassium.

The amount of alkali metal compound to employ is substantially the stoichiometric requirement to oxidize all of the oxygen-containing compound reactants to the corresponding acid salts. The mol ratio of the alkali metal compound to the oxygen-containing compound reactant can vary between about 0.5:1 and 4:1 and is preferably between 1:1 and 1.5:1.

The function of the reaction temperature is to promote the rate of reaction. The reaction temperature can generally vary between about 175° and 400° C. The preferred temperatures depend to some degree upon the type of oxygen-containing compound reactant employed. For the oxidative dehydrogenation of aldehydes, a preferred reaction temperature is between 175° and 260° C. For the other oxygen-containing compound reactants defined above, the preferred reaction temperature is between 240° and 350° C. with the most preferred temperatures being between 320° and 330° C.

The function of reaction pressure is to maintain the reactants in the liquid phase. The reaction pressure can vary over a wide range, for example, from 0 to 2,000 p.s.i.g., or higher, with preferred reaction pressures between 75 and 750 p.s.i.g. The most preferred pressures are between 100 and 400 p.s.i.g.

The reaction time can vary between 0.25 and 6 hours or more. Prolonged contacting times at elevated temperatures promote decomposition of the soap products into undesirable side products such as carbonates. In general, the higher the temperature the shorter the maximum contacting time. At temperatures of about 300° C., for example, the preferred contacting times are between 1 and 2 hours after preheating to reaction temperature. Longer contacting times within the broad range defined above can be employed at the lower reaction temperatures.

The organic acid salt can be separated from the reaction mass by any suitable means, such as solvent extraction. If desired, the organic salt can be converted to the organic acid by treatment with a mineral acid such as hydrochloric acid and the organic acid can thereafter be decanted or otherwise separated.

The invention will be further described with reference to the following specific examples. In all of the examples, the solid carbon employed was Darco G-60, a commercial active carbon sold by Atlas Powder Company. The specifications of this active carbon are given on Table I below.

*Table I*

Darco G-60 specifications:
| | |
|---|---|
| Surface area (square meters per gram) | 500-700 |
| Bulk density (pounds per cubic foot) | 22-28 |
| Mesh size (approximate) | |
| % thru 100 mesh | 95 |
| % thru 325 mesh | 70 |
| Ash (weight percent) | 3-4 |
| Water solubles (maximum in weight %) | 0.3 |
| Acid solubles (maximum in weight %) | 1.0 |
| Moisture content (maximum in weight %) | 12 |

EXAMPLE 1

In this experiment, 390.5 grams (3 mols) of isooctyl alcohol and 124.0 grams (3.02 mols) of solid 97.5 percent NaOH pellets were charged to a one-liter, Inconel-lined, turbo-stirred autoclave. The isooctyl alcohol was prepared by the hydroformylation and subsequent hydrogenation of a mixture of branched chain heptenes. The mixture of branched chain heptenes was the 87° C. to 94° C. fraction (ASTM D1078) of the product from the copolymerization of propylene and butene. The properties of the isooctyl are given on Table II below. The autoclave was purged of air with nitrogen and the stirrer started. The reaction mixture was heated to about 285° C. and the pressure increased to 270 p.s.i.g. The pressure was maintained at 270 p.s.i.g. by the gradual release of the $H_2$ formed, and the temperature increased from 285° to 305° C. After a one hour reaction period, evolution of $H_2$ appeared to cease, and the pressure was gradually reduced (a period of about 30 minutes) to 200 p.s.i.g. while the temperature remained at 290° C. The acid salt was converted to isooctanoic acid by reaction with aqueous HCl, and the products were separated and analyzed. The alcohol conversion was found to be 91.2 mol percent, while the yield of isooctanoic acid was 77.0 mol percent. The efficiency was, therefore, 84.4 mol percent.

Table II.—*Typical inspections of alcohols*

| | Isooctyl Alcohol | Decyl Alcohol |
|---|---|---|
| Specific Gravity 20°/20° C. (68°/68° F.) | 0.833 | 0.838 |
| Color, APHA (by ASTM D-1209-54) | 3 | 3 |
| Refractive Index, $n_D^{20}$ | 1.4312 | 1.4386 |
| Sulfur, p.p.m. | 3 | <1 |
| Water, percent by weight | 0.020 | 0.020 |
| Acidity as Acetic Acid, percent by weight | 0.001 | 0.001 |
| $C_8$ Carbonyl Content, percent by weight | 0.01 | |
| $C_{10}$ Carbonyl Content, percent by weight | | 0.012 |
| Distillation, ASTM D1078: | | |
| Initial Boiling Point, ° C | 185 | 217.0 |
| Dry Point, ° C | 188.5 | 220.3 |

EXAMPLE 2

Example 1 was repeated except 316.8 grams (2.43 mols) of isooctyl alcohol and 82.1 grams (2 mols) of 97.5 percent NaOH pellets were employed together with 4 grams of Darco G-60 solid active carbon (1.26 weight percent based on the alcohol). The reaction time was 1.5 hours while the temperature was maintained at 286° C. and the pressure at 270 p.s.i.g. The organic salt was converted to the acid by reaction with dilute aqueous HCl. Analysis of the product showed an alcohol conversion of 99.5 mol percent, based on the stoichiometric amount of alcohol, a 96.6 mol percent yield of acid, and an efficiency of 97.1 mol percent. In this example and the ones to follow, an excess of alcohol over the stoichiometric amount required to react with the sodium hydroxide was employed. The alcohol conversion figures in this and succeeding examples are based only on the stoichiometric amount of alcohol required. Thus, in this example, the 99.5 mol percent alcohol conversion is based on 2 mols of alcohol (the stoichiometric amount since 2 mols of sodium hydroxide were employed) rather than the actual 2.43 mols employed.

A comparison of Example 2 with Example 1 shows the beneficial effect of the added solid carbon, for the conversion, efficiency and yield all increased.

EXAMPLE 3

Example 2 was repeated except the reaction time was reduced to one hour. The alcohol conversion based on the stoichiometric amount of alcohol was 94.9 mol percent, the yield of acid was 91.4 mol percent and the efficiency was 96.4 mol percent.

A comparison of Example 3 with Example 2 shows that a lower reaction time results in a slight lowering of conversion and thus yield.

EXAMPLE 4

Example 3 was repeated except the solid carbon contained 6.5 percent by weight platinum and the reaction time was 2.5 hours. The alcohol conversion based on the stoichiometric amount of alcohol was 97.5 mol percent. The yield of acid was 92.3 mol percent, and the efficiency was 94.6 mol percent.

A comparison of Example 4 with Example 3 shows the presence of platinum had essentially no effect on the action of the solid carbon.

EXAMPLE 5

Example 4 was repeated except the alcohol was an oxo decyl alcohol whose properties are also given on Table II above, the carbon black contained 6.07 weight percent platinum (0.24 gram), and the amount of carbon black based on the alcohol charge was 1.19 weight percent. The decyl alcohol was prepared by the hydroformylation and subsequent hydrogenation of a mixture of branched chain nonenes having an average of two methyl branches per molecule. The branched chain nonenes are the 138° C. to 146° C. fraction (ASTM D1078) of the polymerization of propylene using a phosphoric acid catalyst. The properties of the decyl alcohol are given on Table II above. After a one-hour reaction period, the decyl alcohol conversion was 98.4 mol percent based on the stoichiometric amount of alcohol, the yield was 97.0 mol percent and the efficiency was 98.5 mol percent.

Example 5 shows the use of solid carbon is also beneficial for the oxidative dehydrogenation of $C_{10}$ oxo alcohols.

Resort may be had to such variations and modifications as fall within the spirit of the invention and the scope of the appended claims.

We claim:

1. A process for the preparation of a salt of at least one oxygen-containing organic acid from at least one oxygen-containing compound reactant selected from group consisting of unsubstituted aliphatic and unsubstituted monocyclic aralkyl primary alcohols having between 1 and 40 carbon atoms; unsubstituted aliphatic and unsubstituted monocyclic aralkyl aldehydes having between 1 and 40 carbon atoms; unsubstituted aliphatic aldols having between 1 and 40 carbon atoms; unsubstituted aliphatic acetals having between 1 and 40 carbon atoms and at least two hydrogen atoms on at least one of the carbon atoms adjacent to at least one of the ether oxygen atoms; unsubstituted aliphatic monoethers having between 1 and 40 carbon atoms and at least two hydrogen atoms on at least one of the carbon atoms adjacent to the ether oxygen atom; and organic esters having between 1 and 40 carbon atoms wherein the acid and alcohol portions of the ester are aliphatic hydrocarbon radicals comprising contacting said oxygen-containing compound reactant in the liquid phase with an alkali metal compound selected from the group consisting of alkali metal oxides and hydroxides under oxidative dehydrogenation conditions including a temperature between 175° and 400° C. and a pressure sufficient to maintain the reactants in the liquid phase in the presence of at least 0.1 weight percent solid carbon based on the amount of said oxygen-containing compound reactant, said solid carbon having a surface area between 25 and 1700 square meters per gram.

2. A process according to claim 1 wherein said oxygen-containing compound reactant has between 4 and 20 carbon atoms per molecule.

3. A process according to claim 1 wherein the alkali metal compound employed is sodium hydroxide.

4. A process according to claim 1 wherein the solid carbon employed has a surface area between 300 and 1200 square meters per gram.

5. A process according to claim 4 wherein the oxygen-containing compound reactant has between 4 and 20 carbon atoms per molecule.

6. A process for the preparation of a salt of an organic acid from at least one unsubstituted aliphatic or monocyclic aralkyl primary alcohol having between 1 and 40 carbon atoms comprising contacting said alcohol in the liquid phase with an alkali metal compound selected from the group consisting of alkali metal oxides and hydroxides under oxidative dehydrogenation conditions including a temperature between 175° and 400° C. and a pressure sufficient to maintain the reactants in the liquid phase in the presence of at least 0.1 weight percent solid carbon based on the amount of said oxygen-containing compound reactant, said solid carbon having a surface area between 25 and 1700 square meters per gram.

7. A process according to claim 6 wherein the primary alcohol has between 4 and 20 carbon atoms per molecule.

8. A process according to claim 7 wherein the solid carbon has a surface area between 300 and 1200 square meters per gram.

9. A process according to claim 8 wherein the amount of solid carbon is between 0.1 and 10 weight percent based on the alcohol.

10. A process according to claim 9 wherein the alkali metal compound is sodium hydroxide.

11. A process according to claim 6 wherein the primary alcohol is isooctyl alcohol.

12. A process according to claim 6 wherein the primary alcohol is decyl alcohol.

13. A process according to claim 10 wherein the primary alcohol is isooctyl alcohol.

14. A process according to claim 10 wherein the primary alcohol is decyl alcohol.

15. A process according to claim 1 wherein the solid carbon is in a finely comminuted form.

16. A process according to claim 15 wherein the solid carbon has a mesh size between 4 and 1000.

References Cited

UNITED STATES PATENTS 2,766,267   10/1956   Hill _____ 260—413

OTHER REFERENCES

Berkman: Catalysis (1949), p. 791.

Sabatier: Catalysis in Organic Chemistry (1923), pp. 94, 228, 242.

ALEX MAZEL, *Primary Examiner.*

J. A. NARCAVAGE, *Assistant Examiner.*